July 13, 1937.  E. T. McCARTHY  2,087,037

VALVE

Filed Feb. 21, 1935  3 Sheets-Sheet 1

Inventor
Elmer T. McCarthy
Rummler, Rummler
+ Woodworth Attys.

Inventor
Elmer T. McCarthy

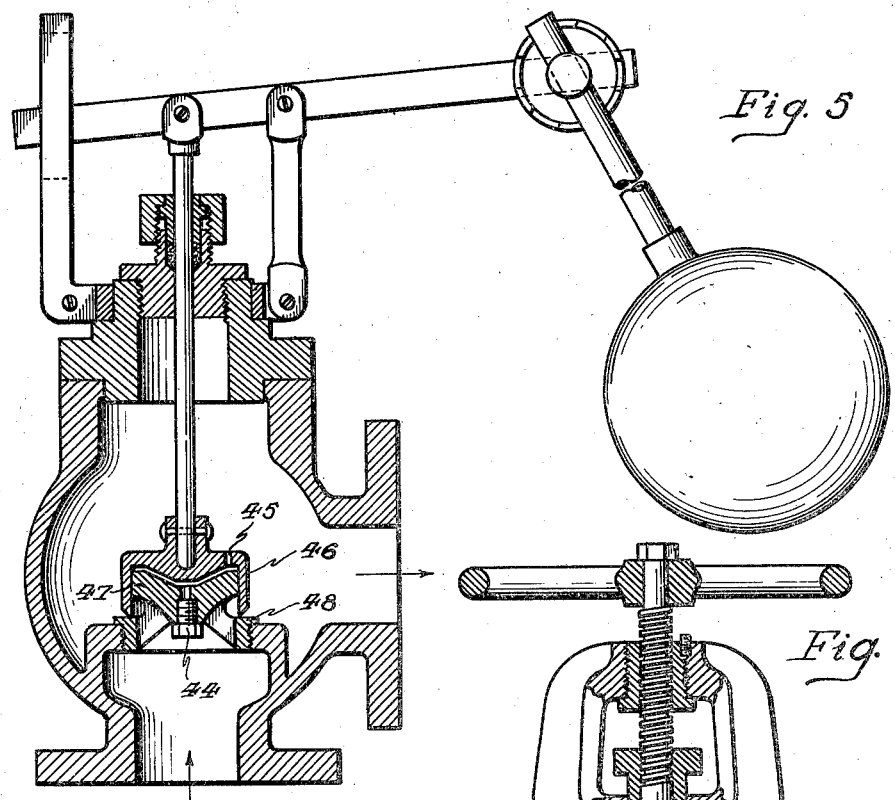
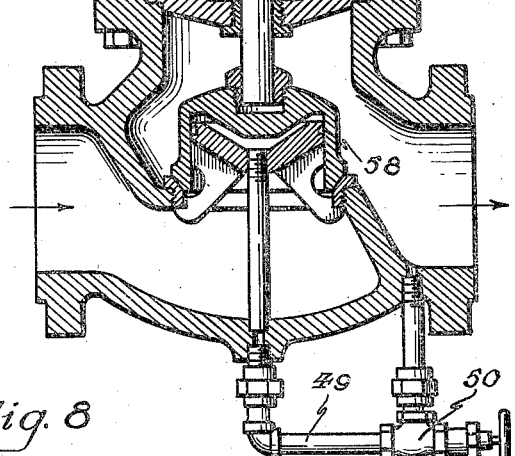
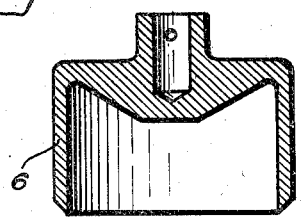
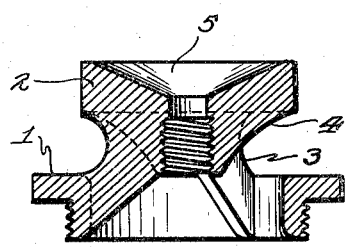
Inventor
Elmer T. McCarthy
Rummler, Rummler
+ Woodworth   Attys.

Patented July 13, 1937

2,087,037

UNITED STATES PATENT OFFICE 2,087,037

VALVE

Elmer T. McCarthy, Chicago, Ill., assignor to
Klipfel Manufacturing Company, Chicago, Ill.,
a corporation of Illinois Application February 21, 1935, Serial No. 7,531

4 Claims. (Cl. 50—20)

This invention relates to valve constructions and the objects thereof are to provide structural features and a method of operation for attaining a uniformly distributed fluid pressure on the disc of a single seated valve irrespective of the amount of valve opening; and also for attaining a balance of fluid pressures on such a valve disc or any desired variation of such pressures for the purpose of increasing the accuracy of regulation and/or the capacity and/or the ease of operation of the valve. The valve construction described herein is adapted for use in many types of automatic pressure regulating valves and also in float-operated, thermostatically operated, and in power or hand-operated stop valves.

The changes required for the adaptation of this valve to different kinds of service are mainly external to the valve. The working parts may be standardized and used interchangeably in different types of valves which is a manifest advantage in manufacturing as it reduces the number of styles of parts.

The objects of the invention as above outlined are attained by protecting the valve disc from the direct action of the fluid passing through the valve and thereby avoiding the objectionable pressure and flow effects which occur in the usual types of valve construction.

The improved construction as applied to different kinds of valves is illustrated in the drawings.

Fig. 5 shows a section of a float valve.

Fig. 6 is a sectional view of a globe valve with the improved balanced disc.

Fig. 7 shows the valve disc which operates in conjunction with the seat bushing and piston.

Fig. 8 illustrates enlarged and in section the preferred form of the seat bushing and piston.

Figure 1:
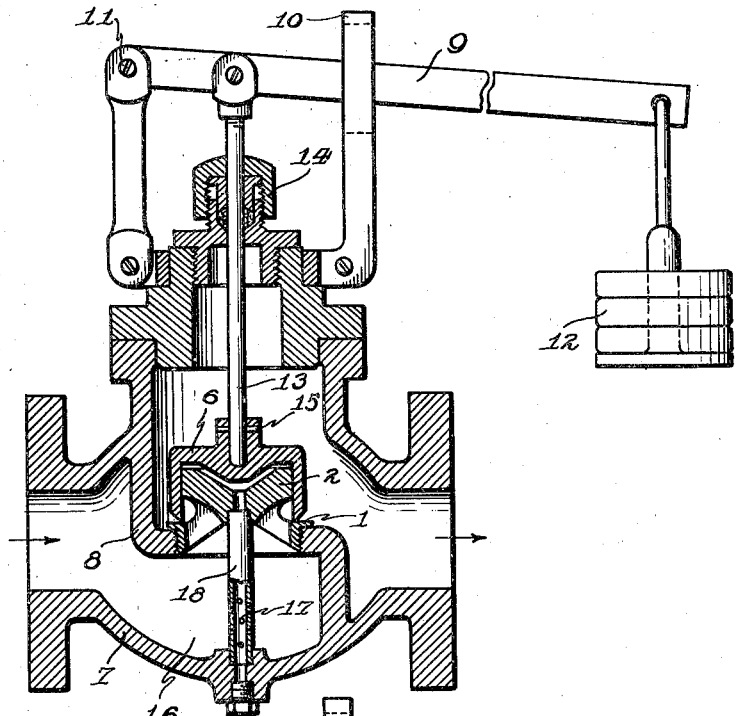
Figure 1 is a longitudinal sectional view showing the improvement applied to a water relief valve.

The term disc as used herein means the movable element which controls the valve port without regard to its geometric form.

A feature common to the various forms illustrated is a cylinder and piston arrangement of the valve disc and its guide whereby the pressure of fluid is confined and therefore uniformly distributed over the projected, circular, effective area of the disc. Moreover, the movable disc is protected almost completely from the direct pressure and impact of the fluid. While various forms of the invention are illustrated in Figs. 1 to 6 inclusive, as incorporated in different types of valves, it should be understood that the particular form shown is not essential to or limited to the type of regulator in which it is illustrated.

A description of the inner valve construction which is essentially the same in all the figures, precedes the descriptions of the various valves.

A clear understanding of this construction may be obtained by reference to Figs. 7 and 8.

Fig. 8 is an axial section of a seat bushing 1 adapted to be screwed into a threaded seat opening in the diaphragm of the valve body. Integral with this seat bushing is the cone-shaped piston 2 attached to the seat bushing by flat radial webs 3. The lower surface 4 of piston 2 is conical to conform approximately to the natural lines of flow of fluid through the ports. The upper surface 5 is conical so as to reduce the volume of air which may accumulate in the clearance space between the piston and disc head for a reason explained later. Piston 2 may be integral with 1 as shown, or it may be separate and supported in the same position from 1 or the valve body wall.

Fig. 7 is an axial section of the cup-shaped disc 6 which in assembly fits snugly over the piston 2 and may slide axially thereon as a guide. The cylindrical wall of 6 is relatively thin with a rounded or angular edge at the bottom for making a pressure-tight contact when seated on 1. The boss at the top of 6 is provided for any convenient means of attaching to the valve stem. The conical inner surface of the disc head permits the use of a deep stem well and brings the point of application of the force exerted by the stem more nearly to the plane of the seating edge and thereby reduces side thrust of the disc against the piston. This conical inner surface of disc 6 fits approximately the concave upper surface of piston 2 to reduce the clearance volume which may fill with air as mentioned above.

Figure 1 shows this improved valve as applied to a water relief valve. Part 7 is the valve body or casing, the inlet and outlet compartments being separated by the partition or diaphragm 8 into which is screwed the seat bushing 1 carrying the stationary piston 2. Disc 6 fits over and is free to move axially on 2. Part 9 is a lever of the third order sliding in the guide 10, about the fulcrum 11 and applying a force due to the weights 12 to the upper end of the valve stem 13. The stem 13 slides through the packing box 14, its lower end bearing on the disc 6 and tending always to close the valve. A pin 15 is inserted through the boss on disc 6 and stem so that the disc 6 may be raised from the seat 1 by hand operation of the stem and lever if desired.

The purpose of valves of this class is to open when the inlet fluid pressure increases to a predetermined amount and discharge fluid to some lower pressure region, usually to atmosphere. A common fault of such valves is that a large increase in inlet pressure is required to open the valve to full port area, over that required for a small amount of valve opening. This fault may be explained by consideration of the construction of a single seated relief or safety valve in which the inlet pressure acts directly on the valve disc tending to lift it off the seat against the force of a weight or spring. When such a valve is closed the inlet pressure is uniformly distributed over the exposed area of the disc. At the point of opening the total fluid pressure under the disc must equal the loading or closing force. When such a plain disc has lifted slightly off the seat the fluid near the perimeter of the disc has a fairly high velocity toward the region of lower pressure so that the inlet pressure is no longer uniformly distributed on the disc.

Inasmuch as the total fluid pressure upward must still equal the loading, it follows that the inlet pressure must increase to compensate for loss of pressure near the perimeter of the disc or what may be termed loss of effective disc area. As the valve opens further, the zone of lower pressure widens toward the center of the disc and a still higher inlet pressure is required to maintain the disc at the greater valve opening.

In this improved construction the pressure of fluid in the inlet compartment 16 of the valve body 7 is transmitted without loss through the holes 17 in the conduit 18 to the space within the disc 6 above the piston 2, where it tends to lift the disc against the constant loading due to the weight. As a result of thus confining the operating pressure, it is uniformly distributed under the disc 6 regardless of the amount of valve lift, and a fluid pressure in the inlet compartment 16 sufficient to lift the disc off the seat will also support the disc at any greater lift within the range of travel permitted.

Consequently a constant pressure is maintained in the inlet compartment of the regulator, provided an increase in pressure in the outlet compartment tending to close the valve does not occur.

As the true capacity of a regulating valve must be considered as the quantity of fluid it will pass without excessive change in the pressure supposed to be maintained constant it will be readily seen that the improved valve construction increases the capacity of a relief valve over that obtainable with the ordinary construction.

Figure 2:
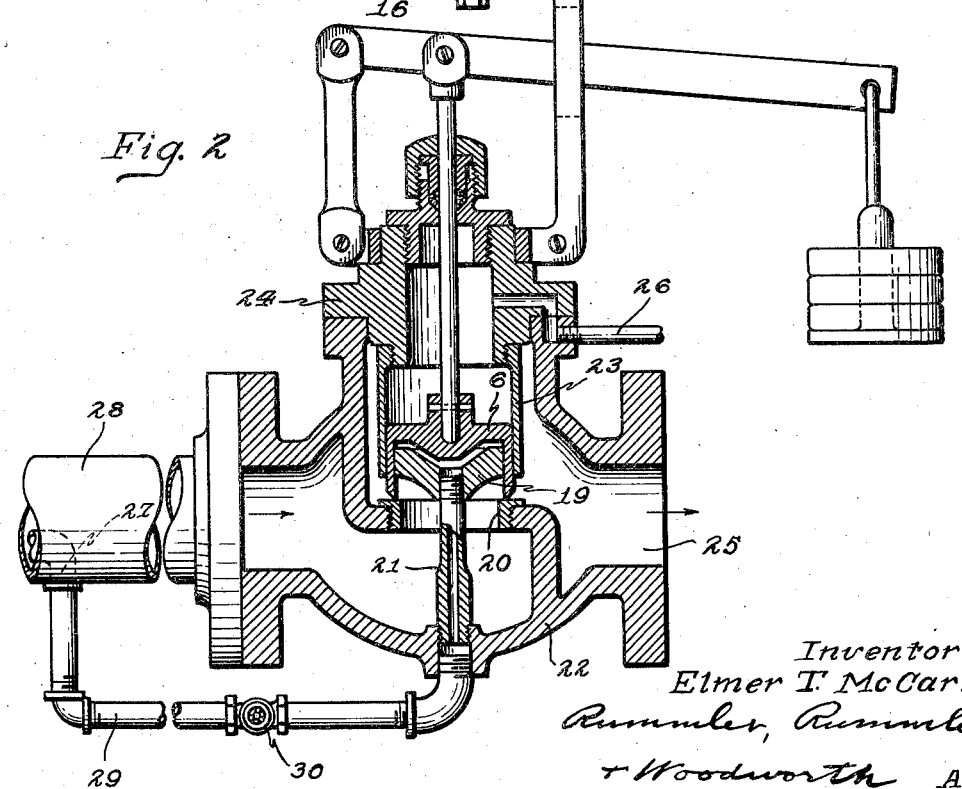
Fig. 2 is a longitudinal section of a back-pressure valve.

Fig. 2 shows a relief valve identical with that shown in Fig. 1 except for slight modifications as described.

The piston 19 is not attached to the seat bushing 20 but is supported in position on the conduit 21 which in turn is secured to the valve casing 22. Also a sleeve 23 has been added. This sleeve is attached to the cover 24 of the valve casing and is a close fit around the outside of disc 6, which is still free to slide in an axial direction. The sleeve 23 excludes possible variable fluid pressure in the outlet compartment 25 of the regulator from the upper surface of the disc. It also protects disc 6 from the lateral pressure of fluid flowing through the compartment.

A vent 26 maintains atmospheric pressure in the space above the disc 6. The operating pressure under the disc is taken from any point 27 in the inlet pipe 28 through the small feeler pipe 29 and the hollow supporting member 21 to the space within the disc 6. A constant pressure is maintained at the point 27, irrespective of pressure loss in the conduit from 27 to the regulator and irrespective of variations of pressure in the outlet compartment.

The speed of action of valve disc 6 may be reduced or controlled by use of the restricting valve 30 in conduit 29. The disc 6 has a dashpot relation with the stationary piston 19.

When the regulator is put into service air will be trapped in the space above the piston causing a chattering action. Most of this air will gradually be forced out through the clearance space between the cylindrical surfaces and replaced by liquid. However, a certain amount will be permanently trapped above the level of the upper rim of the piston. The conical shape of parts shown is designed to reduce to a minimum the volume of air or other gas which may be so trapped.

Figure 3:
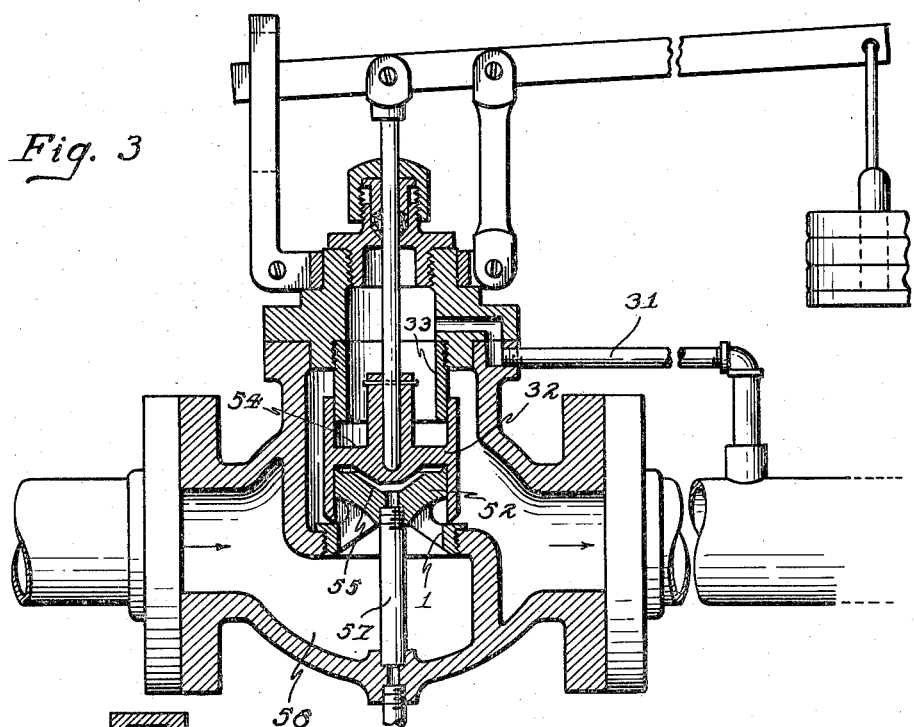
Fig. 3 is a longitudinal section showing the construction as used in a reducing valve.

The construction shown in Fig. 3 in some respects is much the same as that in Fig. 2 but the latter has connections so that it may operate as a reducing valve to maintain a constant outlet or reduced pressure. In Fig. 3, the weighted lever arrangement at the top of the valve is reversed so that the weight tends to open the valve. When the reduced pressure reaches the set amount, it acts through the feeler pipe 31 to close the valve. The valve disc 32 is in this case a double cup. A stationary sleeve 33 fits inside the upper cup of the disc instead of being outside as the element 23 is in Fig. 2. Conduit 57 ordinarily communicates to atmosphere.

The outside sleeve construction shown in Figure 2 is not exactly balanced as to fluid pressures but in Figure 3 exactly equal circular areas of the disc are exposed to fluid pressures from above and below and the disc is perfectly balanced as to fluid pressures.

The various forms shown are illustrative of different manners in which the valve may be connected up and of variations of constructional features. Any of the forms of discs shown may be used on any type of regulating or reducing valve according to the accuracy required, cost of building or service conditions.

Figure 4:
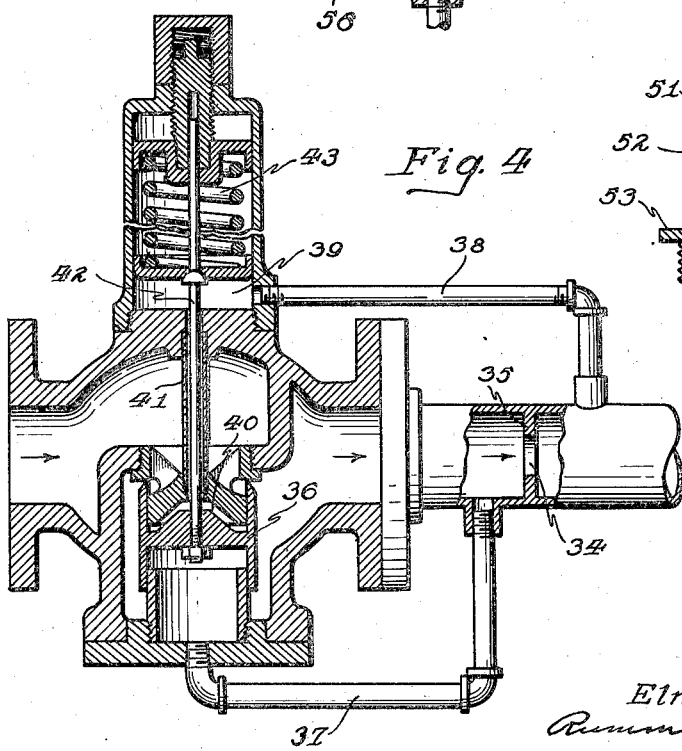
Fig. 4 is a longitudinal section of a differential valve.

Figure 4 shows a differential or excess pressure valve. It will maintain a constant differential between the high and low pressure sides of an orifice, such as 34 in the fixed disc 35, and thereby maintain constant flow of liquid through the orifice regardless of changes in pressure at the regulator inlet or at the downstream side of the orifice. In this case the movable valve 36 is the same as that shown in Figure 3. It is subject to the pressure at the valve side of orifice 34 through the conduit 37 on one side minus the opposite pressure due to conduit 38 connected up at the opposite side of orifice 34 and leading to a chamber 39. This chamber is in communication with the space 40 through tube 41 which surrounds but is spaced away from the valve stem 42. This pressure is supplemented by the action of adjustable spring 43. By these means the differential in pressure at the orifice is maintained constant by an amount depending on the force of the spring 43.

The orifice need not be a fixed orifice as shown but may be an adjustable orifice or water level controller for a boiler. A field of application is to maintain a constant excess or differential of boiler feed water pressure over the steam pressure. The regulator controls the steam supply to the boiler feed pump. The lower feeler pipe 37 would then connect to the pump discharge or boiler feed header and the upper feeler pipe 38 would connect to the steam supply. Or for this service the tube enclosing the valve stem could be omitted and steam pressure taken directly into the space between the stationary piston and web of the cup disc. Then steam pressure plus spring force above the disc would balance water pressure applied below. The differential between water and steam would be that due to a practically constant spring force or a constant weight and lever force.

The valve construction shown in Figs. 3 and 4 is adapted to many different kinds of differential pressure control. Any two fluid pressures may be communicated to opposite faces of the head in the movable valve element and a balance obtained by suitable adjustment of the loading as to amount and direction. Then any change in the differential pressure will vary the port opening so as to restore the desired differential or accomplish other useful results. By admitting atmospheric pressure to one or the other side of head of the movable valve element a constant gage pressure would be maintained by the regulator and a back pressure or reducing valve would result. Such valves are merely special forms of differential valves.

Figure 5 shows the improved disc applied to a float valve. In this case the valve is not operated by pressure but by the float. Consequently the center hole in the piston is omitted or plugged at 44 and a pressure equalizing hole 45 is drilled through the cup. The latter is, therefore, completely balanced as to water pressure and moves easily with a minimum of force exerted by the float.

The cup or valve disk 46 fits over a stationary piston 47 forming part of a seat bushing 48 and connected therewith by three webs. The small hole 45 through the top of the cup vents water which may leak past the piston and equalizes the pressures inside and outside the cup. Consequently, the valve though single seated is perfectly balanced and easily operated. As the pressure and impact of water entering the valve do not act on the cup disk, the valve will operate smoothly and close positively even against high pressure.

Figure 6 shows the invention applied to a globe stop valve. Large stop valves on high pressure service are difficult to operate on account of the unbalanced fluid pressures on the disc, particularly when the valve is nearly closed.

This valve is shown equipped with a by-pass equalizing connection which may be opened or closed by hand valve 50. With the valve 50 open, the main valve may be operated with little effort and without injurious friction or wear on the stem threads. Such wear is a serious problem in high pressure valves.

The description so far has been confined to single seat valves to accentuate one peculiarity of the invention which is the attainment of a balanced condition, when desired, in a single seated valve by extremely simple means.

The construction shown in Figure 3 was described according to its relationship to Figure 2 which is a single seated valve.

Figure 9:
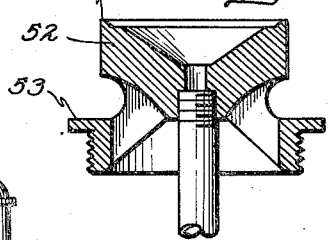
Fig. 9 is an enlarged sectional detail of the double seating stationary piston for the valve shown in Fig. 3.

Figure 3, however, has the added feature that the movable cup disc seats at two points. Figure 9 is an enlarged detail of the stationary piston seat for the cup disc shown in Figure 3 and includes an annular seating ring 51 at the top of piston 52. When the cup disc or cylinder 32 engages the main valve seat 53, the head or central web 54 of this cylinder also engages the seating ring 51. The purpose of this arrangement is to prevent leakage from compartment 56 of the valve body into space 55 between the piston and the cylinder head when the valve is closed. As illustrated the space 55 communicates, for example, with the outside atmosphere through tube 57.

Leakage between the piston and the cylinder from the inlet side of the valve to the atmosphere is stopped when the valve is seated on ring 51. In some cases the stationary piston is also provided with piston rings, as indicated by 58 in Figure 6.

The operation of the various constructions illustrated has been mentioned in the detailed description of the valves, but the action in all cases is similar in this respect, that the valve disc or cup, shown as the movable element of the valve, is protected against the flow or pressure effects within the valve body by the stationary piston element 2, for example, in Figure 1. Any desired pressures on opposite sides of the disc can be had without complicated additions because of this protective feature of the stationary piston 2 and the equivalent fixed piston element such as the sleeve 33 in Figure 3 fitting the top flange of the cylinder 32.

In any of the cases illustrated, the thrust of the fluid on the high pressure side of the valve is against the cone or fixed piston such as 52 in Figure 3, rather than against the valve disc.

The cup disc can be applied to practically any type of valve including the safety, relief, back-pressure, unloading, reducing, differential, pump governors, float valves, thermostatic, globe-stop and check valves.

The velocity head of the fluid, in addition to its pressure head, may be utilized for operating the disc when the conduit 29 in Figure 2 is provided with a short branch 27, shown by broken lines, which faces upstream. The water will flow into the open end. With such means, the velocity head is converted to additional pressure head. Thus additional opening pressure is applied to the disc as the rate of flow increases. This feature is sometimes reversed, for example, on a reducing valve or differential valve by having the feeler pipe face downstream so that the negative velocity head lowers the static pressure head in the feeler pipe. This results in a lower fluid pressure on the disc than the true pressure in the lower pressure pipe and causes the regulator to open more and thereby compensate for loss of pressure by pipe friction between the regulator outlet and point of connection of the feeler pipe.

The moving part of the construction has been referred to as a disc since it corresponds to this part in an ordinary single seat valve, yet in principle of operation, it is like a gate in a gate valve, as it stops the flow by cutting across the stream rather than by pushing against the flow and plugging the seat bore. It is a cylinder gate, The inlet pressure acts radially outward in all directions, balancing any tendency to move the gate or disc sidewise against the guide to cause friction as in an ordinary flat gate. Also the inlet pressure has little tendency to open the valve due to the very limited, narrow area around the edge or rim of the cup. This area is zero when the valve is seated, if the seating edge of the cup is along the inner cylinder surface.

While the flow has been indicated in one direction with reference to the cup, it can obviously be reversed without any change in the construction in the cases of the float and globe valves shown by Figures 5 and 6. For the other types of regulators, the flow may be reversed provided suitable changes are made in the points of connection of the feeler pipes.

I claim:

1. In an automatic back pressure regulating valve, a valve casing having inlet and outlet chambers separated by a diaphragm, a valve port in said diaphragm, a piston adjacent to said port, a movable valve element in the form of a hollow cylinder having a solid partition or head and an open end and fitting over said piston and slideable thereon into and out of engagement with said port so as to close and open said port, means for excluding the fluid pressure in the outlet chamber of the valve casing from the head of said movable valve element, means for admitting atmospheric pressure to the head of said movable valve element on the face opposite said piston, means for loading said movable valve element with a predetermined force, and a passage to communicate the fluid pressure from a point on the inlet side of said port to the space between said piston and the head of said movable element so as to move said element in an opening direction.

2. In an automatic back pressure regulating valve, a valve casing having inlet and outlet chambers separated by a diaphragm, a valve port in said diaphragm, a piston adjacent to said port, a movable valve element in the form of a hollow cylinder having a solid partition and an open end fitting over said piston and slideable thereon into and out of engagement with said port to close and open said port, means for loading said element with a predetermined force, and an open ended conduit facing upstream to transmit the sum of the velocity and static heads at a point upstream from the valve port to the space between said piston and the partition of said movable valve element.

3. In a valve, a valve casing having inlet and outlet chambers separated by a diaphragm with a valve port therein, a piston adjacent to said port, a movable valve element having a hollow cylinder provided with an open end fitting over said piston and slideable thereon toward and away from said port to control passage of fluid through said port and having a solid partition, means for loading said element with a predetermined force, means to prevent the fluid pressure in the outlet chamber from exerting a net force tending to move said cylinder toward the port, and an open ended conduit facing upstream with respect to flow of fluid through said port and leading to the space between said piston and said partition to transmit the sum of the velocity and static heads at a point upstream from said port to the space between said piston and said partition.

4. In a differential fluid pressure regulating valve, a valve casing having inlet and outlet chambers separated by a diaphragm, a valve port in said diaphragm, a piston adjacent to said port, a movable valve element in the form of a hollow cylinder having a closed partition or head and an open end, and fitting over said piston and slideable thereon into and out of engagement with said port so as to close and open same, means for loading said movable element with a predetermined force, means for excluding from the head of said movable element the fluid pressure existing in that region of the chamber of the valve casing in which it is situated, a conduit for communicating a fluid pressure to the space between the piston and the head of the movable valve element, and conduit means for communicating another fluid pressure to that space separated from the first-named space by the head of the movable valve.

ELMER T. McCARTHY.